(12) United States Patent
Kondo et al.

(10) Patent No.: US 12,119,513 B2
(45) Date of Patent: Oct. 15, 2024

(54) SEPARATOR FOR LITHIUM-ION SECONDARY BATTERY

(71) Applicants: ASAHI KASEI KABUSHIKI KAISHA, Tokyo (JP); CELGARD, LLC, Charlotte, NC (US)

(72) Inventors: Takahiko Kondo, Charlotte, NC (US); Kazunori Uchida, Tokyo (JP); Shinya Hamasaki, Tokyo (JP)

(73) Assignees: Asahi Kasei Kabushiki Kaisha, Tokyo (JP); Celgard, LLC, Charlotte, NC (US)

( * ) Notice: Subject to any disclaimer, the term of this patent is extended or adjusted under 35 U.S.C. 154(b) by 620 days.

(21) Appl. No.: 16/491,251

(22) PCT Filed: Apr. 3, 2018

(86) PCT No.: PCT/US2018/025784
§ 371 (c)(1),
(2) Date: Sep. 5, 2019

(87) PCT Pub. No.: WO2018/187255
PCT Pub. Date: Oct. 11, 2018

(65) Prior Publication Data
US 2020/0035969 A1    Jan. 30, 2020

Related U.S. Application Data

(60) Provisional application No. 62/482,239, filed on Apr. 6, 2017.

(51) Int. Cl.
*H01M 50/44* (2021.01)
*B29C 55/00* (2006.01)
(Continued)

(52) U.S. Cl.
CPC .......... *H01M 50/44* (2021.01); *B29C 55/005* (2013.01); *B29C 55/04* (2013.01); *B29C 55/12* (2013.01);
(Continued)

(58) Field of Classification Search
CPC .. H01M 50/44; H01M 50/403; H01M 50/449; H01M 50/411; H01M 10/0525;
(Continued)

(56) References Cited

U.S. PATENT DOCUMENTS 3,893,871 A * 7/1975 Jones ................. H01M 50/44
429/255
4,346,142 A   8/1982 Lazear
(Continued)

FOREIGN PATENT DOCUMENTS

JP   19950188440 A   6/1995
JP   2001150583 A    6/2001
(Continued)

OTHER PUBLICATIONS

English machine translation of Lee et al. (KR 20160065692 A) (Year: 2016).*
(Continued)

*Primary Examiner* — Brian R Ohara
*Assistant Examiner* — Michelle T Leonard
(74) *Attorney, Agent, or Firm* — Hammer & Assocates, P.C.

(57) ABSTRACT

Problem: The invention provides a separator for a lithium-ion secondary battery exhibiting excellent strength, wettability with nonaqueous electrolyte solutions, voltage endurance and cycle characteristics in lithium-ion secondary batteries, and a method of increasing the puncture depth of the separator. Solution: A separator for a lithium-ion secondary battery is formed of a microporous film comprising
(Continued)

a polyolefin resin (A) as a major component, and a resin (B), at least portions of the surfaces of the micropores in the microporous film being coated with resin (B).

18 Claims, 5 Drawing Sheets

(51) Int. Cl.
| | |
|---|---|
| B29C 55/04 | (2006.01) |
| B29C 55/12 | (2006.01) |
| B29K 23/00 | (2006.01) |
| B29K 105/04 | (2006.01) |
| B29L 31/34 | (2006.01) |
| H01M 10/0525 | (2010.01) |
| H01M 50/403 | (2021.01) |
| H01M 50/406 | (2021.01) |
| H01M 50/417 | (2021.01) |
| H01M 50/457 | (2021.01) |
| H01M 50/489 | (2021.01) |
| H01M 50/491 | (2021.01) |

(52) U.S. Cl.
CPC ..... *H01M 10/0525* (2013.01); *H01M 50/417* (2021.01); *H01M 50/457* (2021.01); *H01M 50/489* (2021.01); *H01M 50/491* (2021.01); *B29K 2023/12* (2013.01); *B29K 2105/041* (2013.01); *B29L 2031/3468* (2013.01); *H01M 50/403* (2021.01); *H01M 50/406* (2021.01)

(58) Field of Classification Search
CPC ............. H01M 50/489; H01M 50/417; H01M 50/491; H01M 50/457; H01M 50/406; B29C 55/005; B29C 55/04; B29C 55/12; B29C 2023/12; B29C 2105/041; B29L 2031/3468; B29K 2023/12; B29K 2105/041
See application file for complete search history.

(56) References Cited

U.S. PATENT DOCUMENTS

| | | | |
|---|---|---|---|
| 2014/0045033 A1 | 2/2014 | Zhang et al. | |
| 2014/0178741 A1* | 6/2014 | Hasegawa | H01M 50/426 429/144 |
| 2016/0141574 A1* | 5/2016 | Ryu | B01D 67/003 429/144 |
| 2016/0149182 A1 | 5/2016 | Zhang et al. | |
| 2017/0005321 A1* | 1/2017 | Sugata | H01M 50/581 |

FOREIGN PATENT DOCUMENTS

| | | | | |
|---|---|---|---|---|
| JP | 2012007156 A | | 1/2012 | |
| JP | 2012131990 A | | 7/2012 | |
| JP | 2014004771 A | | 1/2014 | |
| JP | 2016072162 A | * | 5/2016 | |
| JP | 6082699 B2 | * | 2/2017 | ................ C08J 5/18 |
| KR | 20160065692 A | * | 6/2016 | .......... H01M 10/052 |
| WO | WO 2007046226 A1 | | 4/2007 | |
| WO | WO 2013/54929 A1 | | 4/2013 | |

OTHER PUBLICATIONS

English machine translation of Higashioji et al. (JP 6082699 B2) (Year: 2017).*
English machine translation of Ameyama et al. (JP 2016072162 A) (Year: 2016).*
EP Extended Search Report dated Dec. 1, 2020; from counterpart EP Application No. 18780525.4.

* cited by examiner

FIG. 5
(a)
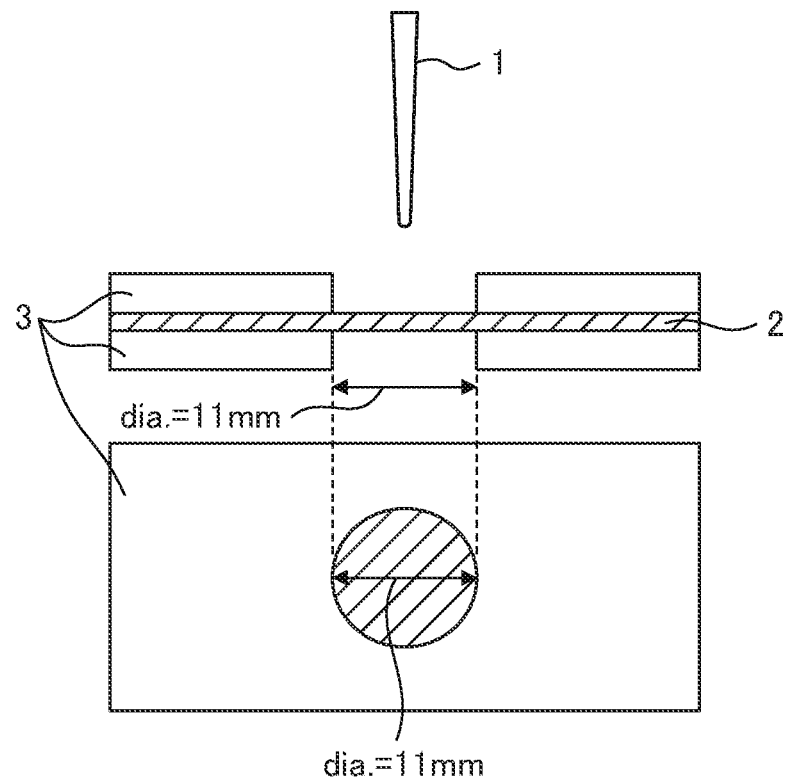
(b)
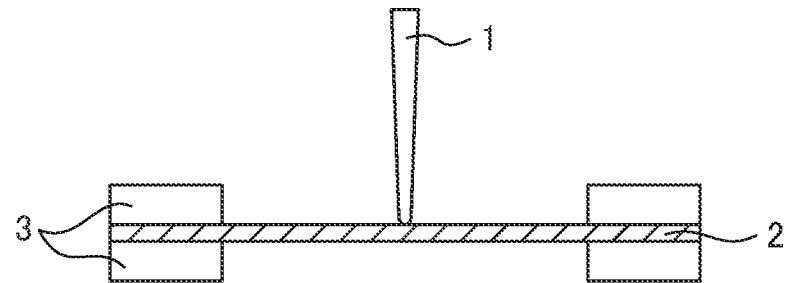
(c)
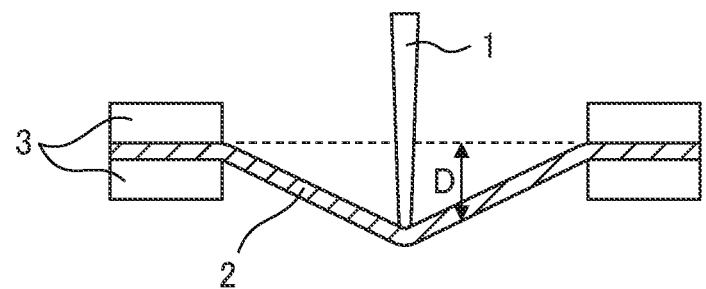

SEPARATOR FOR LITHIUM-ION SECONDARY BATTERY

BACKGROUND OF THE INVENTION

1. Field of the Invention

The present invention relates to a separator for a lithium-ion secondary battery, to separator membranes, etc.

2. Description of the Related Art

Microporous resin films or membranes exhibit electrical insulating properties or ion permeability, and are therefore used in battery separators, condenser separators, fuel cell materials, microfiltration membranes and breathable waterproof films, and especially in separators for lithium-ion secondary batteries.

In recent years, lithium-ion secondary batteries have been used for such applications as miniature electronic devices such as cellular phones and laptop computers, as well as motor vehicles such as electric vehicles and small-size electric motorcycles. Separators for lithium-ion secondary batteries must have strength, gas permeability, ion permeability, and safety when incorporated into batteries.

A resin film is generally formed by melt extrusion of a resin followed by stretching. Methods of pore formation in resin films are largely either dry methods or wet methods.

Dry methods include methods of forming pores by subjecting an unstretched sheet including non-compatible particles such as inorganic particles and a polyolefin, to stretching and extraction to peel off the heterogenous material interface and form pores, as well as lamellar pore opening methods and β-crystal pore opening methods.

A lamellar pore opening method is a method in which the melt crystallization conditions during sheet formation by melt extrusion of a resin are controlled to obtain an unstretched sheet having a crystal lamellar structure, and the unstretched sheet is stretched to cleave the lamellar interface and form pores.

In a β-crystal pore opening method, an unstretched sheet with β crystals that have relatively low crystal density is produced during melt extrusion of polypropylene (PP), and the produced unstretched sheet is stretched to cause conversion to α crystals that have relatively high crystal density, forming pores by the difference in crystal density between the two crystal types.

Wet methods include methods of adding a pore-forming material (extractable matter) such as a plasticizer to a polyolefin and dispersing it, and then extracting the extractable matter with a solvent after sheet formation to form pores, if necessary carrying out stretching before and/or after the extraction.

Microporous film strength has been a subject of study with the aim of using microporous films produced by dry methods as separators for secondary batteries (PTL 1 to 5).

PTL 1 describes biaxial stretching of a sheet that includes a first PP, a second PP or an ethylene-octene copolymer that is non-compatible with the first PP, and a β crystal nucleating agent, using a β-crystal pore opening method. It is stated that the microporous film that is obtained has a strength of at least 40 MPa in the machine direction (MD) while having a porosity of at least 70% and a mean pore size of 40 to 400 nm.

PTL 2 describes a method of subjecting two different types of PP with different melt flow rates (MFR) to melt extrusion and biaxial stretching, in a β-crystal pore opening method.

PTL 3 describes a method of subjecting a mixture of PP and styrene-butadiene elastomer to sequential biaxial stretching, in a β-crystal pore opening method.

PTL 4 describes a microporous PP film obtained by biaxial stretching in a β-crystal pore opening method, the film having a thickness of 10 to 30 μm, a porosity of 55 to 85%, an air permeability resistance of 70 to 300 seconds/100 ml, a puncture strength of 0.18 to 0.50 N/1 μm thickness, a transverse direction (TD) heat shrinkage factor of ≤12% (60 minutes at 135° C.), and a tensile strength of 60 to 200 MPa.

PTL 5 describes co-extrusion of PP pellets and pellets consisting of a polyethylene (PE) and styrene-based elastomer, and biaxial stretching to prepare a porous laminated film, in a β-crystal pore opening method, the aim being to control strength and gas permeability.

Microporous film strength has also been a subject of study with the aim of using microporous films produced by wet methods as separators for secondary batteries (PTL 6). PTL 6 describes a microporous polyolefin film having a variable degree of orientation in the film thickness direction, and a puncture elongation of 2.2 to 2.4 mm, from the viewpoint of both breaking strength and puncture strength.

CITATION LIST

Patent Literature (PTL)

[PTL 1] WO2007/46226
[PTL 2] Japanese Unexamined Patent Publication No. 2012-7156
[PTL 3] Japanese Unexamined Patent Publication No. 2012-131990
[PTL 4] WO2013/54929
[PTL 5] Japanese Unexamined Patent Publication No. 2014-4771
[PTL 6] Japanese Unexamined Patent Publication No. 1995(H7)-188440

SUMMARY OF THE INVENTION

In recent years, lithium-ion secondary batteries have been incorporated into miniature electronic devices and motor vehicles, and have come to be used even in harsh environments. In this regard, separators that include microporous films or membranes are in need of still further improvement in strength, wettability with nonaqueous electrolyte solutions, voltage endurance, and cycle characteristics when incorporated into secondary batteries.

However, the microporous films obtained by the dry methods described in PTLs 1 to 5 or the wet method described in PTL 6, either fail to improve the strength, wettability with nonaqueous electrolyte solutions, voltage endurance and cycle characteristics of secondary batteries, or fail to provide balance among these properties.

Moreover, the microporous films described in PTLs 1 to 6 are still in need of improvement in terms of puncture depth while maintaining gas permeability.

In light of these circumstances, it is an object of the present invention to provide a separator for a lithium-ion secondary battery exhibiting excellent strength, wettability with nonaqueous electrolyte solutions, voltage endurance and cycle characteristics of lithium-ion secondary batteries, and a method of increasing the puncture depth of the separator.

The present inventors have found that the aforementioned problems can be solved by situating a specific resin in a network of an as-molded porous or microporous polyolefin sheet, or by specifying the puncture depth of the microporous polyolefin film, and have thereupon completed this invention.

Specifically, the present invention is as follows.

[1] A separator for a lithium-ion secondary battery, comprising a microporous film, wherein the microporous film comprises:
- a polyolefin resin (A) as a major component; and
- at least one area of surfaces of micropores in the microporous film is coated with a resin (B) different from the polyolefin resin (A).

[2] The separator according to [1], wherein the micropores are formed with fibrils of the polyolefin resin (A), and outer surfaces of the fibrils are surrounded by the resin (B).

[3] The separator according to [1] or [2], wherein, in an intermediate layer selected among the three layers obtained by trisecting the separator in the film thickness direction, at least one part of a surface layer of a skeleton consisting of the polyolefin resin (A) is coated with the resin (B).

[4] The separator according to any one of [1] to [3], wherein the separator has a puncture depth of 2.5 mm or more.

[5] The separator according to [4], wherein the puncture depth is more than 2.5 mm and equal to or less than 4.5 mm.

[6] The separator according to any one of [1] to [5], wherein the resin (B) has an elastic modulus at 25 degrees Celsius of 700 MPa or less.

[7] The separator according to [6], wherein the elastic modulus at 25 degrees Celsius is equal to or more than 100 MPa and equal to or less than 700 MPa.

[8] The separator according to any one of [1] to [7], wherein the resin (B) has a melting point of 130 degrees Celsius or less.

[9] The separator according to any one of [1] to [8], wherein the resin (B) is a hydrophobic resin.

[10] The separator according to [9], wherein the hydrophobic resin has a solubility in octane at 25 degrees Celsius of 20 g/kg or more.

[11] The separator according to [9] or [10], wherein the hydrophobic resin is a polyolefin resin having an elastic modulus at 25 degrees Celsius of 700 MPa or less.

[12] The separator according to any one of [1] to [11], wherein the polyolefin resin (A) comprises a polypropylene resin.

[13] The separator according to any one of [1] to [12], wherein the separator has a porosity of 30% or more.

[14] The separator according to any one of [1] to [13], wherein the separator has a puncture strength of 0.25 kgf or more.

[15] The separator according to any one of [1] to [14], wherein the membrane thickness of the separator is equal to or less than 100 μm.

[16] The separator according to any one of [1] to [15], wherein a fuse temperature of the separator is less than 150° C.

[17] The separator according to any one of [1] to [16], wherein the microporous film is obtainable by stretching a precursor comprising the polyolefin resin (A), and subsequently impregnating the stretched product with the resin (B).

[18] The separator according to [17], wherein the microporous film is obtainable by stretching the precursor in at least a transverse direction (TD), and subsequently impregnating the TD-stretched product with the resin (B).

[19] The separator according to [18], wherein the microporous film is obtainable by stretching the precursor in at least a transverse direction (TD), calendering the TD-stretched product, and subsequently impregnating the calendered product with the resin (B).

[20] The separator according to [18], wherein the microporous film is obtainable by stretching the precursor in at least a transverse direction (TD), impregnating the TD-stretched product with the resin (B), and subsequently calendering the impregnated product.

[21] The separator according to [17], wherein the microporous film is obtainable by stretching the precursor in at least a machine direction (MD), and subsequently impregnating the MD-stretched product with the resin (B).

[22] A separator for a lithium-ion secondary battery, comprising a microporous polyolefin film, wherein the separator has a puncture depth of 2.5 mm or more.

[23] The separator according to [22], wherein the microporous polyolefin film is obtainable by stretching a precursor comprising a polyolefin resin (A), and subsequently impregnating the stretched product with a resin (B) different from the polyolefin resin (A).

[24] The separator according to [23], wherein the microporous polyolefin film is obtainable by stretching the precursor in at least a transverse direction (TD), and subsequently impregnating the TD-stretched product with the resin (B).

[25] The separator according to [24], wherein the microporous polyolefin film is obtainable by stretching the precursor in at least a transverse direction (TD), calendering the TD-stretched product, and subsequently impregnating the calendered product with the resin (B).

[26] The separator according to [24], wherein the microporous polyolefin film is obtainable by stretching the precursor in at least a transverse direction (TD), impregnating the TD-stretched product with the resin (B), and subsequently calendering the impregnated product.

[27] The separator according to [23], wherein the microporous polyolefin film is obtainable by stretching the precursor in at least a machine direction (MD), and subsequently impregnating the MD-stretched product with the resin (B).

[28] The separator according to any one of [23] to [27], wherein, in an intermediate layer selected among the three layers obtained by trisecting the separator in the film thickness direction, at least one part of a surface layer of a skeleton consisting of the polyolefin resin (A) is coated with the resin (B).

[29] The separator according to any one of [22] to [28], wherein a fuse temperature of the separator is less than 150° C.

[30] A method of improving a puncture depth of a separator for a lithium-ion secondary battery, comprising the steps of:
  (1) providing a microporous film comprising a polyolefin resin (A) as a major component;
  (2) coating at least one area of surfaces of micropores in the microporous film with a resin (B) different from the polyolefin resin (A), to form a coated microporous film; and
  (3) forming the separator with the coated microporous film.

[31] The method according to [30], wherein the step (2) is carried out by coating the at least one area of surfaces of micropores with a solution in which the resin (B) is dissolved or dispersed.

[32] The method according to [30], wherein the step (2) is carried out by impregnating the microporous film with a solution in which the resin (B) is dissolved or dispersed.
[33] The method according to any one of [30] to [32], wherein the microporous film is formed in the step (1) by stretching a precursor comprising the polyolefin resin (A) in at least a transverse direction (TD).
[34] The method according to any one of [30] to [32], wherein the microporous film is formed in the step (1) by stretching a precursor comprising the polyolefin resin (A) in at least a transverse direction (TD) with controlled machine direction (MD) relaxation.
[35] The method according to any one of [30] to [32], wherein the microporous film is formed in the step (1) by stretching a precursor comprising the polyolefin resin (A) in a machine direction (MD) and a transverse direction (TD).
[36] The method according to any one of [30] to [32], wherein the microporous film is formed in the step (1) by stretching a precursor comprising the polyolefin resin (A) in at least a machine direction (MD).
[37] The method according to any one of [30] to [32], wherein the microporous film is formed in the step (1) by stretching a precursor comprising the polyolefin resin (A) in at least a machine direction (MD) and then in a transverse direction (TD) with controlled machine direction (MD) relaxation.
[38] The method according to any one of [33] to [37], wherein the stretched product passes between a pair of calender rollers.
[39] The method according to any one of [30] to [32], wherein the coated microporous film passes between a pair of calender rollers.
[40] The method according to any one of [30] to [39], wherein, in an intermediate layer selected among the three layers obtained by trisecting the separator in the film thickness direction, at least one part of a surface layer of a skeleton consisting of the polyolefin resin (A) is coated with the resin (B).
[41] The method according to any one of [30] to [40], wherein a fuse temperature of the separator is less than 150° C.

According to the invention, it is possible to provide a separator for a lithium-ion secondary battery exhibiting excellent strength, wettability with nonaqueous electrolyte solutions, voltage endurance, and cycle characteristics of lithium-ion secondary batteries.

BRIEF DESCRIPTION OF THE DRAWINGS

FIG. 5 is a schematic diagram for illustration of puncture test conditions and puncture depth, (a) being a side view and plate top view representing the relationship among the needle, the separator and the separator-holding plate at the start of the puncture test, (b) being a side view representing the positional relationship between the needle and the separator upon contact, and (c) being a side view representing the positional relationship between the needle and the separator during measurement of the puncture depth.

DETAILED DESCRIPTION OF THE INVENTION

Figure 1:
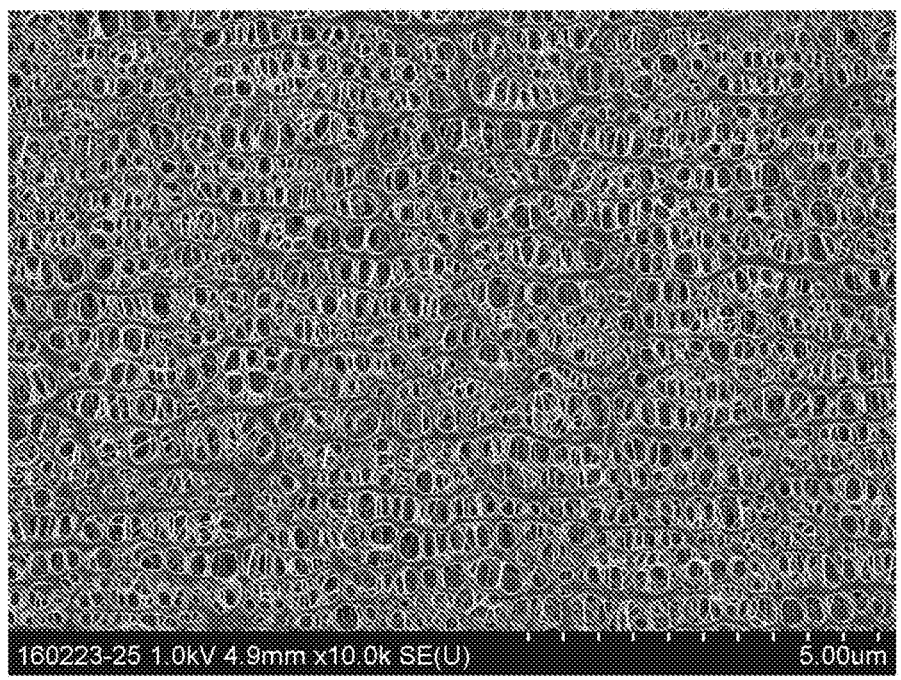
FIG. 1 is an SEM photograph of the surface of a conventional microporous film.

Embodiments for carrying out the invention (hereunder referred to as "embodiments") will now be explained in detail. It is to be understood, however, that the invention is not limited to these embodiments, and may incorporate various modifications within the scope of the gist thereof.
<Separator for Lithium-Ion Secondary Battery>
One aspect of the invention is a separator for a lithium-ion secondary battery. As used herein, a "separator" is a member disposed between a plurality of electrodes in a lithium-ion secondary battery and being permeable to lithium ions, and depending on the need it may also have a shutdown property.
The separator for a lithium-ion secondary battery of the first embodiment comprises a microporous film, the microporous film comprising a polyolefin resin (A) as the major component and a resin (B) covering at least one area of the surfaces of the micropores of the microporous film. In the first embodiment, the resin (B) is different from the polyolefin resin (A).
From the viewpoint of preventing concentration of stress in the microcracks of the micropores inside a separator, it is preferable that in an intermediate layer selected among the three layers obtained by equally splitting the separator in three in the film thickness direction, the separator comprises resin (A) and resin (B), and at least one part of a surface layer of a skeleton consisting of resin (A) is coated with resin (B). In order to confirm whether or not the skeleton is coated with resin (B), in a sealed vessel in which the separator and $RuO_4$ (produced by Rare Metallic Co., Ltd.) coexist, the separator is stained by steam for four hours to prepare a ruthenium-stained separator. 10.6 mL of Quetol812 (produced by Nisshin EM Co., Ltd.) as an epoxy embedding base resin, 9.4 mL of MNA (produced by Nisshin EM Co., Ltd.) as an curing agent and 0.34 mL of 2,4,6-tris(dimethylaminomethyl)phenol (special grade chemical DMP-30 produced by Wako Pure Chemical Industries, Ltd.) as an accelerant are mixed, kneaded and defoamed, and then injection-molded into the ruthenium-stained separator, and cured at 60° C. for twelve hours or more to carry out the epoxy resin embedment. An ultrathin slice (having a thickness of about 50 to 100 nm) of the epoxy-resin embedded separator is formed by using an ultramicrotome (EM-UC7 prepared by Leica Microsystems Co., Ltd.), a surface of the section of the separator is observed by a Transmission Electron Microscope (TEM) to take a photograph, the photograph is trisected in the thickness direction to obtain three layers, and the three layers are respectively referred to as the surface layer, intermediate layer and surface layer in the thickness direction. Since resin (A) and resin (B) are different in the stainability or crystallinity, coating of resin (B) to the resin (A) surface in the intermediate layer can be confirmed based on the photograph.
In addition, a coated amount of resin (B) is not limited but is preferably 5 to 70 weight % based on the total resin weight. The coated amount of resin (B) is preferably 5 weight % or more from the viewpoint of preventing concentration of stress in microcracks, and is preferably 70 weight % or less from the viewpoint of maintaining sufficient fine pores to maintain lithium ion permeability. For the same reason, coated amounts of resin (B) in the surface and intermediate layers preferably satisfy the relationship represented by the following formula:

Coated amount in intermediate layer/Coated amount in surface layer=0.5 to 1.5.

With respect to the coated amounts, the intermediate layer is released from the separator by removing the surface layer(s) by means of laser technique, etc., and the intermediate layer is then weighed (i.e., the total resin weight of resin (A) plus resin (B) is measured). The intermediate layer is extracted from the separator without the surface layer(s) for 12 hours by using a solvent such as octane in about thirty times the weight of the intermediate layer, and then dried to measure a weight of resin (B). The coated amount is then calculated according to the following formula:

Coated amount of resin (B)=Weight of resin (B)/
(Weight of resin (A)+Weight of resin (B))
=Weight of resin (B) in extracted intermediate layer/Total resin weight in intermediate layer.

The surface layer is released from the separator by removing the intermediate layer in the same way as the above, and the same measurement and treatment as the above are then carried out to calculate the coated amount in surface layer, followed by the "Coated amount in intermediate layer/Coated amount in surface layer".

The micropores of the microporous film are formed by a network structure composed of the polyolefin resin (A). At least one of the micropores is defined by the minimal unit of the network structure composed of the polyolefin resin (A) (hereunder referred to as "fibril").

If the resin (B) covers at least portions or the entirety of the surfaces of the micropores, it will be possible to prevent stress from concentrating in microcracks in the micropores and to thus improve the puncture strength of the separator.

Furthermore, if the resin (B) covers the parts of the surfaces of the micropores that are highly hydrophobic, the wettability with nonaqueous electrolyte solutions containing carbonate-based solvents will be increased, and ion conduction will be promoted as a result of the increased wettability, thereby helping to maintain the high cycle characteristics of the secondary battery. The high cycle characteristics provided by the separator of the first embodiment can be maintained at a level equivalent to or exceeding the cycle characteristics of a separator comprising a conventional microporous polyolefin film.

If the resin (B) covers the surfaces of the micropores, and preferably the outer peripheral sections of the fibrils that are composing the micropores, the voltage endurance of the separator can be improved.

The separator of the first embodiment therefore has excellent strength, wettability with nonaqueous electrolyte solutions, voltage endurance and cycle characteristics for lithium-ion secondary batteries, due to the surface coating of the micropores by the resin (B).

From the viewpoint of preventing concentration of stress in the microcracks of the micropores and increasing the wettability with electrolyte solutions, the resin (B) preferably covers the surfaces of the voids inside the separator or microporous film without covering the outer surface of the separator or microporous film.

From the viewpoint of the strength of the microporous film and separator and wettability with nonaqueous electrolyte solutions, the micropores coated with the resin (B) preferably do not include covalent bonds between the polyolefin resin (A) and the resin (B), or do not contain a hydrophilic resin coating. More preferably, the surface coating of the resin (B) on the micropores does not have the structural unit monomer of the resin (B) graft polymerized on the outer peripheral sections of the fibrils composed of the polyolefin resin (A).

The separator for a lithium-ion secondary battery according to the second embodiment comprises a microporous polyolefin film, and has a puncture depth of 2.5 mm or greater.

As used herein, "puncture depth" is the moving distance (depth) of a specific-size needle from the moment after it contacts the separator until it opens a hole, assuming that the peripheral edges of the separator are anchored and the needle is used to pierce the separator in the thickness direction from the outer surface of the separator. The methods for measuring the puncture depth and puncture strength are explained in the Examples.

Herein, constitution of a separator having excellent strength, wettability with nonaqueous electrolyte solutions, voltage endurance, and cycle characteristics of secondary battery is specified by a puncture depth of 2.5 mm or greater of the separator. The puncture strength of the separator will also tend to be improved if its puncture depth is 2.5 mm or greater. The property of a puncture depth of 2.5 mm or greater has been found to be useful as an index for selection of polyolefin materials that can be used to form microporous polyolefin films. For further improved puncture strength, the puncture depth of the separator is preferably greater than 2.5 mm and equal to or less than 4.5 mm, more preferably greater than 2.6 mm and equal to or less than 4.5 mm, and most preferably greater than 2.7 mm and equal to or less than 4.5 mm.

The microporous polyolefin film of the second embodiment can be formed of the same polyolefin resin (A) that is used for the first embodiment, or it may be formed of the polyolefin resin (A) and the resin (B).

The porosity of the separator for a lithium-ion secondary battery is preferably 30% or greater, more preferably greater than 30% and up to 95%, even more preferably 35% or greater and up to 75%, and most preferably 35% or greater and up to 55%. The porosity is preferably 30% or greater from the viewpoint of improved ionic conductivity. The porosity of the separator can be adjusted by controlling the resin composition, the blending ratio of the resin and plasticizer, the stretching conditions, the heat setting conditions, etc.

The puncture strength of the separator for a lithium-ion secondary battery is in the range of preferably 0.25 kgf or greater and more preferably 0.25 to 0.60 kgf, from the viewpoint of productivity of the separator and safety of the secondary battery.

The membrane thickness of the separator for a lithium-ion secondary battery is preferably no greater than 100 μm, more preferably in the range of 2 to 80 μm and even more preferably in the range of 3 to 30 μm, from the viewpoint of balance between puncture strength and puncture depth, and miniaturization of the secondary battery. The membrane thickness of the separator can be adjusted by optimizing the conditions for producing the microporous film.

The constituent elements of the embodiment described above will now be described.

<Microporous Film>

The microporous film of this embodiment comprises a polyolefin resin (A) as the major component, and also has a resin (B) different from the polyolefin resin (A), in at least one area of the surfaces of the micropores. The microporous film preferably has low electrical conductivity, exhibits ionic conductivity, has high resistance to organic solvents and has fine pore diameters.

The microporous film comprising a polyolefin resin (A) as the major component means that the proportion of the polyolefin resin (A) in the microporous film is at least 50 mass % with respect to the mass of the microporous film. The proportion of the polyolefin resin (A) in the microporous film is preferably between 50 mass % and 100 mass %, inclusive, more preferably between 55 mass % and 99 mass %, inclusive, and most preferably between 60 mass % and 98 mass % and inclusive, from the viewpoint of wettability, thickness and shutdown properties of the film.

The polyolefin resin (A) serving as the major component of the film forms a polymer network with micropores, and the surfaces of the micropores are coated with the resin (B). From the viewpoint of supporting the polymer network in the film, the polyolefin resin (A) is preferably non-soluble in octane or hexane at room temperature. This means that, preferably, no components from the polyolefin resin (A) are present in an octane- or hexane-extract obtained from the film.

Examples for the polyolefin resin (A) include homopolymers, copolymers or multistage polymerization polymers obtained using monomers such as ethylene, propylene, 1-butene, 4-methyl-1-pentene, 1-hexene and 1-octene. Such resins for the polyolefin resin (A) may be used alone, or two or more may be used in admixture.

From the viewpoint of shutdown properties, it is preferred to use polyethylene, polypropylene, and copolymers thereof, as well as mixtures thereof, while from the viewpoint of shutdown properties, octane-insolubility and hexane-insolubility, one or several types of polypropylene are more preferably used.

Specific examples of polyethylene include low-density polyethylene, linear low-density polyethylene, medium-density polyethylene, high-density polyethylene and ultra-high molecular weight polyethylene. As used herein, "high-density polyethylene" refers to polyethylene with a density of 0.942 to 0.970 g/cm$^3$. The density of polyethylene is the value measured according to D) Density gradient tube method specified by JIS K7112 (1999).

Specific examples of polypropylene include isotactic polypropylene, syndiotactic polypropylene and atactic polypropylene.

An ethylene-propylene copolymer may be in the form of a random or block structure, or ethylene-propylene rubber.

A microporous film comprising the polyolefin resin (A) as the major component may be in the form of a monolayer or a multilayer. From the viewpoint of gas permeability, strength and octane-insolubility, a monolayer film is preferably formed as a single layer comprising polypropylene as the polyolefin resin (A). From the viewpoint of gas permeability, strength and internal penetration of the resin (B), a multilayer film preferably has an outer layer comprising polypropylene as the polyolefin resin (A), and an inner layer comprising polyethylene as the polyolefin resin (A).

The resin (B), which is a different resin from the polyolefin resin (A), is situated so as to cover at least one area of the surfaces of the micropores of the microporous film, and preferably so as to cover the outer peripheral sections of the fibrils composing the micropores.

In order to deliver the relatively soft resin (B) to the micropores and prevent concentration of stress in the microcracks of the micropores, thereby increasing the puncture strength of the separator, the elastic modulus of the resin (B) at 25° C. is preferably 50 to 700 MPa, more preferably 80 to 700 MPa, even more preferably 100 to 700 MPa and yet more preferably 110 to 650 MPa.

Resin (B) is preferably, from the viewpoint of internal penetration, for example, (1) a latex as a polymer dispersed in water; and (2) a polymer solution in which resin (B) is dissolved in a solvent such as octane. As the latex (1), a resin (B) latex having a smaller particle size than a pore size of a separator is preferably used. As the polymer solution (2), even though the mechanism thereof is not clear, resin (B) having a solubility in hexane or octane is preferably used, and a polymer solution that a solubility of resin (B) in octane at 25° C. is 20 g/kg or greater is more preferably used.

The melting point of the resin (B) is preferably no higher than 130° C. and more preferably 50 to 125° C., from the viewpoint of wettability to the polyolefin resin (A) and productivity of the microporous film. As used herein, the "melting point" of a polymer is the temperature (° C.) corresponding to the endothermic peak observed with melting of the crystalline polymer, in a DSC curve obtained by differential scanning calorimetry (DSC) of the polymer. When two endothermic peaks are observed in the DSC curve, the temperature corresponding to the endothermic peak at the higher temperature end is defined as the melting point.

The resin (B) is preferably a hydrophobic resin from the viewpoint of gas permeability, puncture strength and puncture depth of the microporous film. As used herein, a "hydrophobic resin" is a resin that is either completely insoluble in water, or that has a solubility in water of less than 1 g/kg at 25° C.

From the viewpoint of gas permeability and strength of the microporous film, the resin (B) is preferably soluble in hexane or octane, and more preferably the resin (B) has a solubility in octane of 20 g/kg or greater at 25° C. From the same viewpoint, the elastic modulus of the resin (B) used as a starting material for the microporous film is preferably approximately equal to the elastic modulus of the extract obtained from the microporous film using hexane or octane.

From the viewpoint of resin content, thickness, gas permeability and strength of the microporous film, the resin (B) is preferably a polyolefin resin such as polyethylene, polypropylene or polybutene, or a copolymer thereof, or polyethylene terephthalate, polycycloolefin, polyethersulfone, polyamide, polyimide, polyimideamide, polyaramid, polyvinyldifluoride, nylon, polytetrafluoroethylene, polymethacrylate, polyacrylate, polystyrene or polyurethane, or a copolymer thereof. More preferred are resins including polyolefin resins such as polyethylene, polypropylene and polybutene and copolymers thereof; polymethacrylate, polyacrylate, polystyrene and polyurethane and copolymers thereof; and polyethylene terephthalate, polycycloolefin, polyethersulfone, polyamide, polyimide, polyimideamide, polyaramid, polycycloolefin, nylon and polytetrafluoroethylene, among which polyolefin resins such as polyethylene, polypropylene and polybutene and copolymers thereof are preferred. The resin (B) is more preferably a polyolefin resin with an elastic modulus of no greater than 700 MPa at 25° C., and even more preferably, it is a low melting point polyolefin resin with an elastic modulus of 110 to 520 MPa at 25° C. and a melting point of no higher than 130° C.

Examples for the resin (B) include low molecular weight polypropylene with a weight-average molecular weight of up to 140,000, copolymers of a C3 monomer and a C4 monomer (for example, α-olefin copolymers composed of a C4 main component/C3 accessory component, and α-olefin copolymers composed of a C3 main component/C4 accessory component), and polypropylene with low stereoregularity.

The resin (B) is preferably situated on the surfaces of the micropores in the microporous film, without being localized on its outermost surface (outer surface), and more preferably all or portions of the surfaces of the micropores are coated with the resin (B). Without wishing to be bound by any theory, it is possible that when the resin (B) is present on the micropore surfaces to an extent that allows a practical level of gas permeability to be maintained for the microporous film, the resin (B) relaxes and prevents concentration of stress in the sites where stress may concentrate and cause defects and the like in the microporous film, such that the breaking depth and breaking strength of the film are improved. In order to increase the puncture strength of the film, it is common to take approaches of increasing the piercing stress (rigidity), such as steps of increasing the thickness, increasing the basis weight of the resin or increasing the rigidity of the resin itself. According to the present invention, however, it is presumed that when the resin (B) is coated on the surfaces of the micropores in such a manner that the resin B is impregnated in the sites of stress concentration where defects may occur in the microporous film, the resin (B) relaxes and prevents concentration of stress at sites where stress tends to concentrate, resulting in increased breaking depth and breaking strength of the microporous film. As a result of the increased strength obtained according to the invention, it is possible not only to increase the rigidity but also to improve the breaking depth and thereby improve the physical properties of the separator.

In regard to the proportion of the resin (B) with respect to the polyolefin resin (A), preferably the resin (B) is applied to the resin (A) in a ratio such that the porosity of the microporous film formed by resins (A) and (B) is 30% to 85% of the porosity of a microporous film formed by resin (A) alone.

The microporous film may also include constituent elements other than resins (A) and (B). Such constituent elements include, for example, woven fabrics or nonwoven fabrics of resin fibers, or paper, insulating material particle aggregates and the like.

The porosity of the microporous film is preferably 30% or greater, more preferably greater than 30% and up to 95%, even more preferably 35% or greater and up to 75%, and most preferably 35% or greater and up to 55%. From the viewpoint of improved ionic conductivity, the porosity is preferably 30% or greater, while from the viewpoint of strength it is preferably no greater than 95%. The porosity can be adjusted by controlling the resin composition, the blending ratio of the resin and plasticizer, the stretching conditions, the heat setting conditions, etc.

The puncture strength of the microporous film is in the range of preferably 0.25 kgf or greater and more preferably 0.25 to 0.60 kgf, from the viewpoint of productivity of the separator and safety of the secondary battery. From the viewpoint of puncture strength, wettability in nonaqueous solvents and voltage endurance, the puncture depth of the microporous film is preferably 2.5 mm or greater, more preferably greater than 2.5 mm and equal to or less than 4.5 mm, even more preferably 2.6 mm or greater and equal to or less than 4.5 mm, and most preferably 2.7 mm or greater and equal to or less than 4.5 mm.

The membrane thickness of the microporous film is preferably 0.1 µm or greater and equal to or less than 100 µm, more preferably 1 µm or greater and equal to or less than 50 µm, even more preferably 3 µm or greater and equal to or less than 25 µm, and most preferably 5 µm or greater and equal to or less than 20 µm. It is preferably 0.1 µm or greater from the viewpoint of mechanical strength, and preferably equal to or less than 100 µm from the viewpoint of obtaining a battery with high capacity. The membrane thickness can be adjusted by controlling the die lip gap, the stretching conditions, etc.

The mean pore size of the microporous film is preferably 0.03 µm or greater and equal to or less than 0.80 µm, and more preferably 0.04 µm or greater and equal to or less than 0.70 µm. From the viewpoint of ionic conductivity and voltage endurance, it is preferably 0.03 µm or greater and equal to or less than 0.80 µm. The mean pore size can be adjusted by controlling the resin composition, the extrusion conditions, the stretching conditions, the heat setting conditions, etc.

The viscosity-average molecular weight of the microporous film is preferably between 30,000 and 12,000,000, inclusive, more preferably 50,000 or greater and less than 4,000,000, and even more preferably 100,000 or greater and less than 1,000,000. If the viscosity-average molecular weight is 30,000 or greater, the melt tension during melt molding will be increased, resulting in satisfactory moldability, while the strength will also tend to be high due to entanglement between the polymers. If the viscosity-average molecular weight is 12,000,000 or lower, it will be easier to accomplish uniform melt kneading, and the sheet moldability, and especially its thickness stability, will tend to be superior.

In the case where an internal temperature of a battery increases due to an external short circuit of the battery, etc., thermal runaway may result in the battery exploding or igniting. However, the thermal runaway can be prevented by use of a separator in the battery, i.e., the separator is designed to occlude micropores thereof at a predefined temperature, and an electric resistance (ER) or air permeability (Gurley) of the separator raises to prevent a reaction between a positive electrode and a negative electrode. Accordingly, a temperature at which the electric resistance or air permeability of the separator raises is referred to as "fuse temperature". A fuse temperature of a separator for a battery is preferably, sufficiently low to ensure safety of the battery, more preferably 130° C. or less, further preferably 50° C. or more and 125° C. or less.

<Method for Producing Microporous Film>

The microporous film can be produced by forming pores in a melt-kneaded product or molded sheet of a polyolefin resin composition, using a dry method or wet method.

Dry methods include a method of melt kneading and extruding the polyolefin resin composition, and then peeling the polyolefin crystal interface by heat treatment and stretching, and a method of melt kneading the polyolefin resin composition together with an inorganic filler, molding the kneaded mixture into a sheet, and then stretching it to produce separation at the interface between the polyolefin and inorganic filler.

Wet methods include a method of melt kneading the polyolefin resin composition and a pore-forming material and molding them into a sheet form, if necessary with stretching, and then extracting the pore-forming material, and a method of dissolving the polyolefin resin composition and then immersing the solution in a poor solvent for the polyolefin to solidify the polyolefin, simultaneously removing the solvent.

The polyolefin resin composition comprises the polyolefin resin (A) at preferably 50 mass % or greater, and more preferably between 60 mass % and 100 mass %, inclusive.

The polyolefin resin composition may also comprise a resin other than the polyolefin resin (A), as well as optional additives. Examples of the additives include inorganic fillers, antioxidants, metal soaps, ultraviolet absorbers, light stabilizers, antistatic agents, anti-fogging agents and color pigments.

Melt kneading of the polyolefin resin composition can be carried out, for example, with an extruder, kneader, Laboplastomil, kneading roll or Banbury mixer.

The pore-forming material may be a plasticizer, an inorganic filler, or a combination thereof.

Examples of plasticizers include hydrocarbons such as liquid paraffin and paraffin waxes; esters such as dioctyl phthalate and dibutyl phthalate; and higher alcohols such as oleyl alcohol and stearyl alcohol.

Examples of inorganic fillers include oxide-based ceramics such as alumina, silica (silicon oxide), titania, zirconia, magnesia, ceria, yttria, zinc oxide and iron oxide; nitride-based ceramics such as silicon nitride, titanium nitride and boron nitride; ceramics such as silicon carbide, calcium carbonate, aluminum sulfate, aluminum hydroxide, potassium titanate, talc, kaolin clay, kaolinite, halloysite, pyrophyllite, montmorillonite, sericite, mica, amesite, bentonite, asbestos, zeolite, calcium silicate, magnesium silicate, diatomaceous earth and quartz sand; and glass fibers.

The sheet molding can be carried out using a T-die or metal roll, for example. The molded sheet may also be rolled using a double belt press machine or the like.

The pore-forming step can be carried out by a known dry method and/or wet method. A stretching step may also be carried out, either during the pore-forming step or before or after the pore-forming step. Stretching treatment may be carried out by uniaxial stretching or biaxial stretching, with biaxial stretching being preferred from the viewpoint of improving the strength of the obtained microporous film. When a molded sheet is subjected to high-ratio stretching in the biaxial directions, the molecules are oriented in the in-plane direction, rendering the final product less likely to tear and providing high puncture strength. Examples of stretching methods include simultaneous biaxial stretching, sequential biaxial stretching, multistage stretching and repeated stretching. Simultaneous biaxial stretching is preferred from the viewpoint of increasing the puncture strength and obtaining greater uniformity during stretching and superior shutdown properties. Sequential biaxial stretching is preferred from the viewpoint of facilitating control of the planar orientation.

Simultaneous biaxial stretching is a stretching method in which stretching in the MD (the machine direction during continuous molding of the microporous film) and stretching in the TD (the direction crossing the MD of the microporous film at a 90° angle) are carried out simultaneously, and in such a case the draw ratios in each direction may be different. Sequential biaxial stretching is a stretching method in which stretching in the MD and TD are carried out independently, in such a manner that when the MD or TD stretching is being carried out, the other direction is in a non-constrained state or in an anchored state with fixed length.

In order to minimize contraction of the microporous film, heat treatment may be carried out to produce heat setting, either after stretching or after pore formation. The heat treatment may include a stretching operation carried out with the prescribed temperature environment and the prescribed degree of stretching to adjust the physical properties, and/or relaxation operation carried out with the prescribed temperature environment and the prescribed degree of relaxation, to reduce the stretching stress. The relaxation operation may also be carried out after the stretching operation. The heat treatment can be carried out using a tenter or roll stretcher.

A method of producing a microporous film by a dry lamellar pore opening method will now be described as an example. In the dry lamellar pore opening method, a precursor in which numerous spherocrystals with a lamellar structure are bonded via an amorphous polymer, is stretched to cleave the lamellar interface and thereby form pores, without using a solvent such as water or an organic solvent.

A dry lamellar pore opening method preferably includes (i) a step of extruding a precursor comprising the polyolefin resin (A), and (ii) a step of uniaxial stretching of the extruded precursor. The precursor comprising the polyolefin resin (A) is supplied for at least one stretching operation in the machine direction (MD) or transverse direction (TD), and it may be a molten resin, a resin composition or a molded resin, for example. The precursor that is subjected to extrusion molding in step (i) may be an extrusion molded article, a master-roll sheet or a raw film, for example. The microporous film obtained by a dry lamellar pore opening method that includes steps (i) and (ii) is preferably subjected to coating, immersion or impregnation with resin (B).

Step (i) can be carried out by a conventional extrusion method. The extruder used may comprise a T-die or cyclic die, having elongated holes.

The uniaxial stretching in step (ii) may be carried out in the manner described above. Uniaxial stretching may be in the machine direction (MD) or the transverse direction (TD). Biaxial stretching in which the precursor is stretched in the transverse direction (TD) after uniaxial stretching is preferred. In biaxial stretching it is possible to carry out machine direction (MD) stretching and transverse direction (TD) stretching with simultaneously controlled relaxation in the MD direction. The MD stretching may include both cold stretching and hot stretching. The microporous film obtained by the stretching in step (ii) is preferably subjected to coating, immersion or impregnation with resin (B).

From the viewpoint of minimizing internal strain of the precursor, the precursor may be annealed during step (i), after step (ii) or prior to the stretching in step (ii). The annealing may be carried out in a range between a temperature of 50° C. lower than the melting point of the polyolefin resin (A), and a temperature of 10° C. lower than the melting point of the polyolefin resin (A), or in a range between a temperature of 50° C. lower than the melting point of the polyolefin resin (A) and a temperature of 15° C. lower than the melting point of the polyolefin resin (A).

During or after step (ii), the product that has been stretched in the MD and/or TD direction is preferably subjected to calendering treatment. The calendered product is preferably subjected to coating, immersion or impregnation with resin (B). The calendering treatment may be carried out by passing the stretched product through at least a pair of calender rolls. The pair of calender rolls may comprise, for example, a set of a steel roll and an elastic roll, or a set of two steel rolls. The pair of calender rolls may be heated or cooled during the calendering treatment.

From the viewpoint of microporous film strength and post-treatment with resin (B), in the dry lamellar pore opening method described above it is more preferred to employ a process of subjecting the precursor comprising the polyolefin resin (A) to successive or simultaneous stretching in the MD and TD directions, and then supplying it for calendering treatment (hereunder referred to as "MD/TD/calender process"). From the viewpoint of increased strength, successive stretching in which TD stretching is carried out after MD stretching is even more preferred for the MD/TD/calender process.

<Method of Improving Puncture Depth of Separator for Lithium-Ion Secondary Battery>

Another aspect of the invention is a method of increasing the puncture depth of a separator for a lithium-ion secondary battery using the microporous film described above.

A method of increasing the puncture depth of the separator according to the third embodiment comprises the steps of:

(1) providing a microporous film comprising a polyolefin resin (A) as a major component;
(2) coating at least one area of the surfaces of the micropores in the microporous film with a resin (B) different from the polyolefin resin (A), to form a coated microporous film; and
(3) forming the separator for a lithium-ion secondary battery with the coated microporous film.

The polyolefin resin (A) and resin (B) used in the method of increasing the separator puncture depth are the same as described above.

In step (1), a microporous film comprising the polyolefin resin (A) as the major component is formed by the method for producing a microporous film as described above.

In step (1), it is preferable to form the microporous film by the dry lamellar pore opening method described above, while it is more preferable to stretch the precursor comprising the polyolefin resin (A), and it is even more preferable to stretch the precursor comprising the polyolefin resin (A) in the machine direction (MD) and/or the transverse direction (TD), or to stretch it in at least the transverse direction (TD) with controlled relaxation in the machine direction (MD), and it is even yet more preferred to pass the stretched product through at least a pair of calender rolls.

In step (2), all or portions of the surfaces of the micropores of the microporous film are covered by resin (B). In step (2), all of the resin (B) is not fixed to the outermost side of the microporous film (i.e. the film surface), but rather infiltrates through the network of micropores of the microporous film formed of the polyolefin resin (A), reaching the surfaces of the micropores, and thereby allowing the puncture depth to be increased while maintaining the gas permeability of the microporous film. From the viewpoint of the voltage endurance of the separator, the fibrils composing the micropores are preferably covered by resin (B) in step (2).

From the viewpoint of covering more fibrils with resin (B), step (2) is preferably carried out using a solution in which resin (B) is dissolved or dispersed. From the same viewpoint, the solution in which resin (B) is dissolved is more preferably a solution of resin (B) dissolved in an organic solvent such as hexane, octane or methylene chloride. A solution in which resin (B) is dispersed is more preferably an aqueous latex containing resin (B), isopropyl alcohol (IPA) and/or a surfactant, and water.

From the viewpoint of separator strength and wettability with nonaqueous electrolyte solutions, step (2) is preferably carried out by impregnating the microporous film with the solution in which resin (B) is dissolved or dispersed. From the viewpoint of separator strength, step (2) more preferably does not include electron beam graft polymerization of the monomer structural unit of resin (B) onto the fibrils made of the polyolefin resin (A).

Impregnation of the microporous film in the solution in which resin (B) is dissolved or dispersed may be carried out by dipping the microporous film in a tank containing a solution in which resin (B) is dispersed or dissolved, or coating the outer surface of the microporous film with a solution in which resin (B) is dispersed or dissolved, to allow resin (B) to penetrate into the micropores inside the microporous film.

Dipping the microporous film into a tank containing a solution in which resin (B) is dispersed or dissolved may be carried out at 20 to 60° C. over a period of 0.5 to 15 minutes.

Coating a solution in which resin (B) is dispersed or dissolved onto the outer surface of the microporous film may be carried out by application with a printer or coater or by hand, by addition of the resin (B) solution or resin (B) dispersion onto the film as droplets.

The microporous film that has been coated in step (2) may be passed through at least a pair of calender rolls. The pair of calender rolls is used in the same manner as in the dry lamellar pore opening method described above.

From the viewpoint of fixing resin (B) on the micropore surfaces, step (2) is preferably followed by drying the coated microporous film in an air atmosphere or under an inert gas atmosphere, at a temperature of 20 to 100° C.

In step (3), the coated microporous film obtained in step (2) is used to form a separator for a lithium-ion secondary battery.

In step (3), the coated microporous film that has been coated with resin (B) on at least one area of the surfaces of the micropores may be directly used as a separator for a lithium-ion secondary battery, or it may be laminated with another porous film, or surface-coated with a functional coating material. When it is to be surface-coated with a functional coating material, the surface coating of the functional coating material and coating onto the outer surface, to cause penetration of resin (B) into the micropores of the porous film, are preferably carried out simultaneously in a single process, from the viewpoint of simplifying the production process.

One example of a method for producing a separator for a lithium-ion secondary battery may include a step of modifying a conventional separator for a lithium-ion secondary battery by a method of increasing the puncture depth of the separator according to the third embodiment.

The values measured for the various physical properties described above are the values measured by the methods described in the following examples, unless otherwise specified.

EXAMPLES

The present embodiment will now be explained in greater detail by examples and comparative examples, with the understanding that the invention is not limited to the examples so long as its gist is maintained. The methods of evaluating the starting materials used and the various properties were as follows.

The melt flow rate (MFR) was measured according to JIS K 7210, at 210° C. with 2.16 kg for polypropylene resins and at 190° C. with 2.16 kg for polyethylene resins (units: g/10 min.). The resin densities were all measured according to JIS K 7112 (units: kg/m$^3$).

The properties of the films were measured as follows.
(1) Thickness (μm)

An IDC112 Digimatic Indicator by Mitsutoyo Corp. was used to measure the thickness of the porous film at room temperature (23±2° C.).

(2) Porosity (%)

A 5 cm×5 cm square sample was cut out from the porous film, and the porosity was calculated from the volume and mass of the sample using the following formula.

Porosity (%)=(Volume (cm$^3$)−mass (g)/resin composition density (g/cm$^3$))/volume (cm$^3$)×100

(3) Gas Permeability (sec/100 cc)

The gas permeability of the porous film was measured using a Gurley air permeability tester, according to JIS P-8117.

(4) Puncture Strength (gf) and Puncture Depth (mm)

FIG. 5 shows a schematic diagram for illustration of the puncture test conditions and the puncture depth. During the puncture test, a needle (1) having a hemispherical tip with a radius of 0.5 mm was prepared, the separator (2) was sandwiched between two plates (3, 3) having opening diameters (dia.) of 11 mm, and the needle (1), separator (2) and plates (3, 3) were set in the positional relationship shown in FIG. 5(a). An MX2-50N by Imada Co., Ltd. was used for a puncture test under conditions with a needle tip curvature radius of 0.5 mm, a separator-holding plate opening diameter of 11 mm and a puncture speed of 2 mm/sec, the needle (1) and separator (2) were contacted (FIG. 5(b)), the maximum puncture load (i.e. puncture strength (gf)) was measured, and the degree of needle displacement (mm) from the moment after contact of the needle with the separator until reaching the maximum puncture load (puncture strength) was measured as the puncture depth (D) (FIG. 5(c)).

(5) Electrolyte Solution Wettability

A porous film cut to a 5 cm length in the TD (transverse direction) and a 1 cm length in the MD (machine direction) was dipped in a mixed solvent of ethylene carbonate (EC) and ethylmethyl carbonate (EMC) at 1:1 (volume ratio) (Kishida Chemical Co., Ltd.), up to only 1 cm of the tip, and was then allowed to stand for 120 seconds, after which the liquid level height as it was drawn up to the non-immersed portion was measured and used as an index of wettability.

(6) Fuse Temperature

Two sheets (A, B) of nickel foil having a thickness of 10 μm are prepared, one sheet (A) of nickel foil is masked by Teflon (registered trademark) tape on a glass slide such that a 10 mm-by-10 mm square part of the sheet (A) is exposed, and the sheet (A) is secured on the glass slide.

On a ceramic plate connected to a thermocouple, the other sheet (B) of nickel foil is placed, and a microporous film which has been fully impregnated with an electrolyte solution by immersing the film in the electrolyte solution for three hours, as a measurement sample, is placed on the sheet (B), the glass slide attached with the sheet (A) of nickel foil is placed on the microporous film, and a silicon rubber is then on the glass slide.

The microporous film has been impregnated with 1 mol/L solution of lithium borofluoride (the solvent of which is propylene carbonate/ethylene carbonate/gamma-butyrolactone=1/1/2) as the electrolyte solution.

The above-formed ceramic plate, sheets (A, B) of nickel foil and glass slide are set on a hot plate, and a temperature thereof is elevated at a rate of 15° C./min., while applying a pressure of 1.5 MPa thereto by an oil hydraulic pressing machine. At elevated temperature, an impedance change is measured by an LCR meter under the alternate current condition of 1V and 1 kHz. In this measurement, a temperature at which an impedance reaches one-and-a-half times a minimum value of the impedance on a higher temperature side of the minimum value is obtained as a fuse temperature.

Example 1

A polypropylene resin (MFR: 2.0, density: 0.91) as polyolefin resin (A) was loaded through a feeder into a single-screw extruder set to pore diameter=30 mm, L/D (L: distance (m) from material feed port to discharge hole of extruder, D: inner diameter (m) of extruder, same hereunder)=30 and temperature=200° C., and then extruded from a T-die (200° C.) having a lip thickness of 2.5 mm, that was installed at the tip of the extruder. Immediately following this, an air knife was used to blow cold air at 25° C. onto the molten resin, and the resin was taken up onto a cast roll set to 95° C., at a draw ratio of 200 and a take-up speed of 20 m/min, and shaped into a film.

The obtained film was subjected to annealing for 1 hour in a hot air circulating oven heated to 145° C. The annealed film was then subjected to uniaxial stretching at a temperature of 25° C. to a factor of 1.2 in the machine direction, to obtain a cold drawn film. The cold drawn film was subsequently subjected to uniaxial stretching at a temperature of 140° C. to a factor of 2.5 in the machine direction, and heat set at 150° C. to obtain a uniaxially stretched film. The uniaxially stretched film was subjected to uniaxial stretching at a temperature of 145° C. to a factor of 4.0 in the transverse direction, and heat set at 145° C., to obtain a microporous film (C0).

After weighing out 10 g of a C4/C3 α-olefin copolymer (B1, TAFMER™ BL2491 by Mitsui Chemicals, Inc.) with an elastic modulus of 260 MPa at 25° C. in a flask for use as resin (B), 190 g of octane (Wako Pure Chemical Industries, Ltd.) was weighed out, and a 5% C4/C3 α-olefin copolymer octane solution dissolving a C4/C3 α-olefin copolymer was obtained. The microporous film (C0) was dipped in the solution for 10 minutes and then removed, the solution remaining on the surface was wiped off, and then drying was carried out for 1 hour on a glass plate at room temperature, to obtain a microporous film (C1) having resin (B) on the micropore surfaces. Based on the film weight before and after dipping, the microporous film (C1) was confirmed to have 1.1 g/m$^2$ of resin (B1). The puncture strength of the obtained microporous film (C1) was high at 240 gf, the puncture depth was high at 2.80 mm, and the gas permeability was 129 seconds. The electrolyte solution wettability was a satisfactory value of 5.0 mm.

Example 2

After weighing out 14 g of a C4/C3 α-olefin copolymer (B1, TAFMER™ BL2491 by Mitsui Chemicals, Inc.) with an elastic modulus of 260 MPa in a flask for use as resin (B), 186 g of octane (Wako Pure Chemical Industries, Ltd.) was weighed out, and a 7% C4/C3 α-olefin copolymer octane solution dissolving a C4/C3 α-olefin copolymer was obtained.

The microporous film (C0) obtained in Example 1 was dipped in the solution for 10 minutes and then removed, the solution remaining on the surface was wiped off, and then drying was carried out for 1 hour on a glass plate at room temperature, to obtain a microporous film (C2) having resin (B) on the micropore surfaces. Based on the film weight before and after dipping, the microporous film (C2) was confirmed to have 1.9 g/m$^2$ of resin (B1). The puncture strength of the obtained microporous film (C2) was high at 270 gf, the puncture depth was high at 2.89 mm, and the gas permeability was 244 seconds. The electrolyte solution wettability was a satisfactory value of 5.5 mm.

Figure 2:
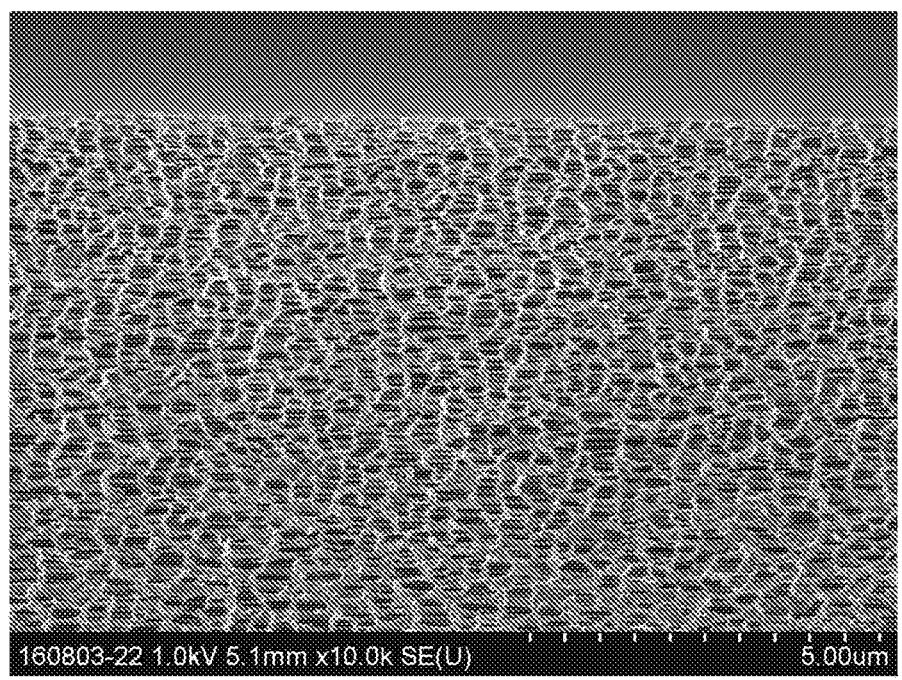
FIG. 2 is an SEM photograph of a cross-section of a conventional microporous film.

FIG. 1 shows a scanning electron microscope (SEM) photograph of the surface of a microporous film (C0) before addition of resin (B1), and FIG. 2 shows a SEM photograph of an MD cross-section of the microporous film (C0).

Figure 3:
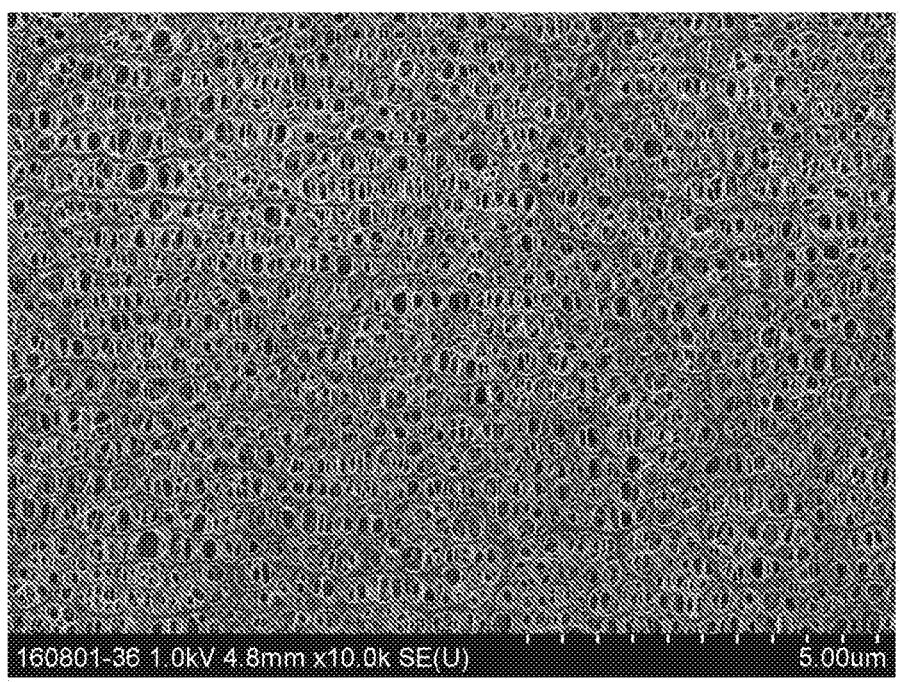
FIG. 3 is an SEM photograph of the surface of a microporous film according to one embodiment of the invention.
Figure 4:
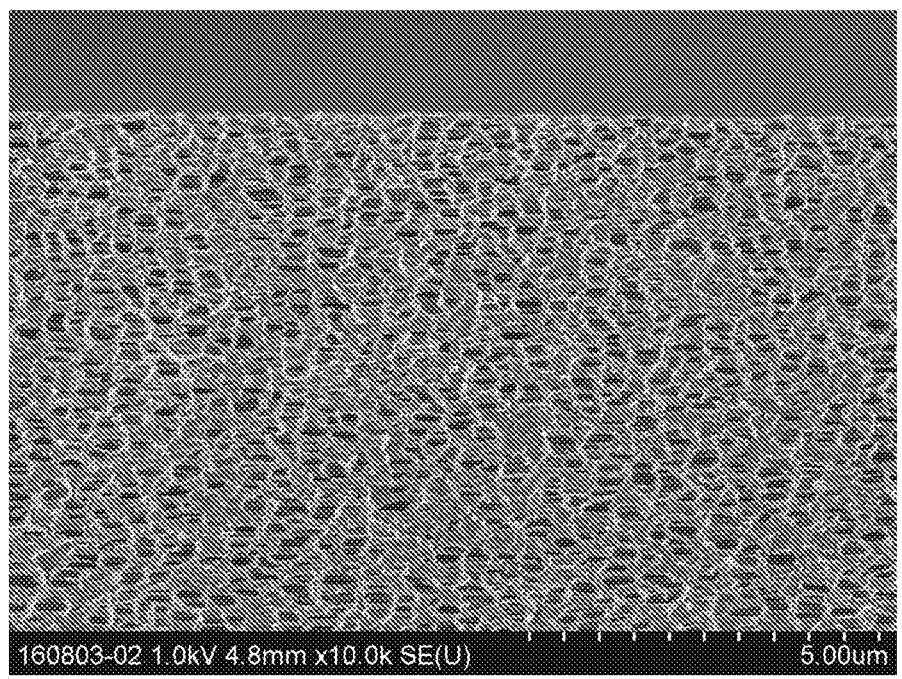
FIG. 4 is an SEM photograph of a cross-section of a microporous film according to one embodiment of the invention.

FIG. 3 shows a SEM photograph of the surface of a microporous film (C2) after addition of resin (B1), and FIG. 4 shows a SEM photograph of an MD cross-section of the microporous film (C2).

By comparing FIG. 1 to FIG. 3 and by comparing FIG. 2 to FIG. 4, it is seen that resin (B1) penetrated to the interiors of the pores in the microporous film (C2) and coated the pore surfaces, without localizing on the outermost surface of the microporous film (C2).

Figure 7:
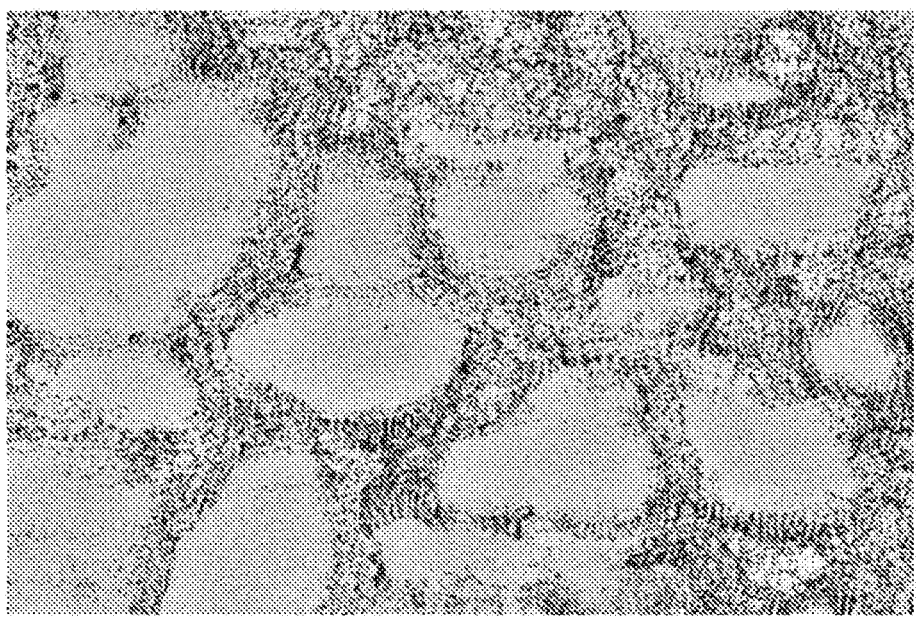
FIG. 7 is a Transmission Electron Microscope (TEM) photograph of an intermediate layer in a Machine-Direction (MD) cross-section of a microporous film used in Example 2.

FIG. 7 shows a TEM photograph of an intermediate layer selected among three layers in MD cross-section of the microporous film (C2).

It is clear in FIG. 7 that resin (B1) is observed as a striped pattern due to the crystallinity thereof, is confirmed to be in the intermediate layer of the microporous film (C2), and covers the pore surface.

After removing the surface layer from the microporous film (C2), resin (B1) was extracted from the intermediate layer by dipping the intermediate layer in octane in thirty times the weight of the intermediate layer for 12 hours, and then dried to measure the weight, and as a result, the coated amount in the intermediate layer was 36%. The coated amount in the surface layer was confirmed in the same way as the above, and the ratio of the coated amount in the intermediate layer to the coated amount in the surface layer was calculated to obtain the following result:

Coated amount in intermediate layer/Coated amount in surface layer=1.1.

Figure 6:
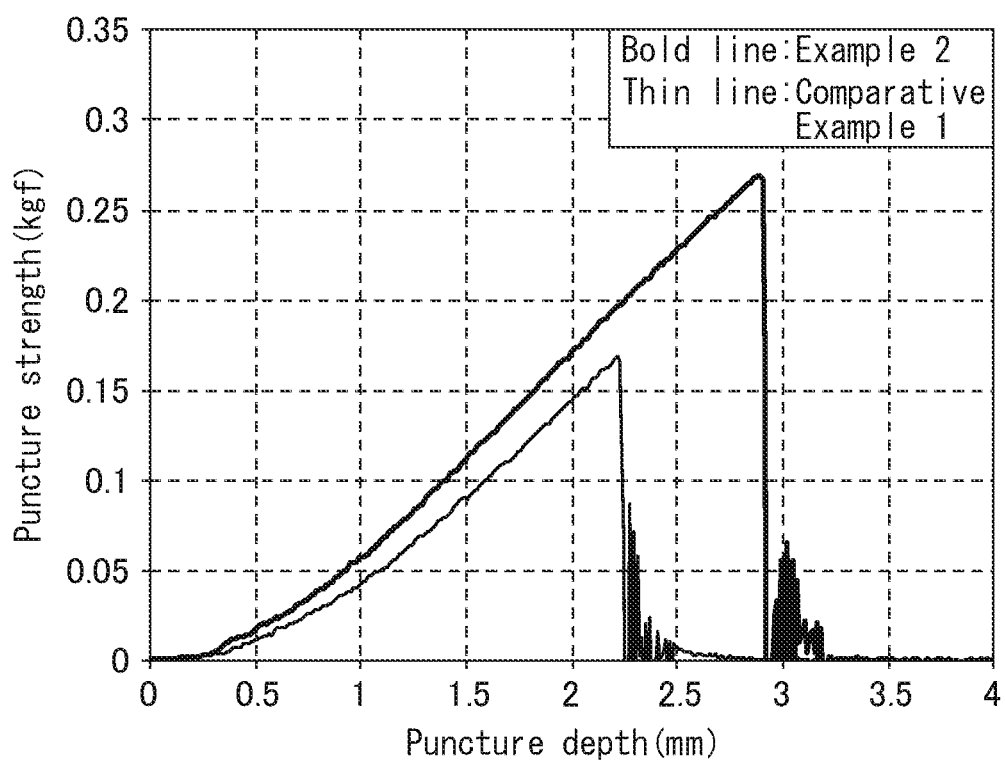
FIG. 6 is a graph for comparison of the depth-stress curve in a puncture test for a microporous film before and after addition of the resin (B1).

FIG. 6 shows a depth-stress curve in a puncture test of the microporous film (C0) prior to addition of resin (B1), and a depth-stress curve in a puncture test of the microporous film (C2) after addition of resin (B1). As seen from FIG. 6, penetration of resin (B1) to the interiors of the pores of the microporous film allows concentration of stress to be avoided at sites where stress tends to concentrate, and as a result, the breaking depth and breaking strength are both increased.

Example 3

After weighing out 10 g of a C4/C3 α-olefin copolymer (B1, TAFMER™ BL2491 by Mitsui Chemicals, Inc.) with an elastic modulus of 260 MPa in a flask for use as resin (B), 190 g of octane (Wako Pure Chemical Industries, Ltd.) was weighed out, and a 5% C4/C3 α-olefin copolymer octane solution dissolving a C4/C3 α-olefin copolymer was obtained.

An applicator with a clearance of 75 μm was used to coat the solution onto the microporous film (C0) obtained in Example 1 on a glass plate, after which the coating was dried for 1 hour at room temperature on the glass plate, to obtain a microporous film (C3) having resin (B) on the micropore surfaces. Based on the film weight before and after dipping, the microporous film (C3) was confirmed to have 1.8 g/m$^2$ of resin (B1). The puncture strength of the obtained microporous film (C3) was high at 264 gf, the puncture depth was high at 2.88 mm, and the gas permeability was 220 seconds. The electrolyte solution wettability was a satisfactory value of 5.0 mm.

Example 4

After weighing out 14 g of a C3/C4 α-olefin copolymer (B2, TAFMER™ XM7090 by Mitsui Chemicals, Inc.) with an elastic modulus of 520 MPa in a flask for use as resin (B), 186 g of octane (Wako Pure Chemical Industries, Ltd.) was weighed out, and a 7% C3/C4 α-olefin copolymer octane solution dissolving a C3/C4 α-olefin copolymer was obtained.

The microporous film (C0) obtained in Example 1 was dipped in the solution for 10 minutes and then removed, the solution remaining on the surface was wiped off, and then drying was carried out for 1 hour on a glass plate at room temperature, to obtain a microporous film (C4) having resin (B) on the micropore surfaces. Based on the film weight before and after dipping, the microporous film (C4) was confirmed to have 1.8 g/m$^2$ of resin (B2). The puncture strength of the obtained microporous film (C4) was high at 262 gf, the puncture depth was high at 2.81 mm, and the gas permeability was 288 seconds. The electrolyte solution wettability was a satisfactory value of 5.0 mm.

Example 5

After weighing out 14 g of a low stereoregular polypropylene resin (B3, L-MODU™ S901 by Idemitsu Kosan Co., Ltd.) with an elastic modulus of 110 MPa in a flask for use as resin (B), 186 g of octane (Wako Pure Chemical Industries, Ltd.) was weighed out, and a 7% low stereoregular polypropylene resin octane solution dissolving a low stereoregular polypropylene resin was obtained.

The microporous film (C0) obtained in Example 1 was dipped in the solution for 10 minutes and then removed, the solution remaining on the surface was wiped off, and then drying was carried out for 1 hour on a glass plate at room temperature, to obtain a microporous film (C5) having resin (B) on the micropore surfaces. Based on the film weight before and after dipping, the microporous film (C5) was confirmed to have 1.8 g/m$^2$ of resin (B3). The puncture strength of the obtained microporous film (C5) was high at 258 gf, the puncture depth was high at 2.82 mm, and the gas permeability was 183 seconds. The electrolyte solution wettability was a satisfactory value of 6.0 mm.

Example 6

After weighing out 15.0 g of a polyurethane acrylate-based copolymer aqueous dispersion (B4, UCOAT UWS-145 by Sanyo Chemical Industries, Ltd., solid content: 35.5 wt %) in a flask for use as resin (B), 18.0 g of distilled water and 9.5 g of isopropyl alcohol (Kanto Kagaku Co., Ltd.) were weighed out, and a 15% polyurethane acrylate-based copolymer dispersion dispersing a polyurethane acrylate-based copolymer was obtained.

The microporous film (C0) obtained in Example 1 was dipped in the dispersion for 10 minutes and then removed, the dispersion remaining on the surface was removed with a resin roller on a glass plate, and then drying was carried out for 1 hour on a glass plate at room temperature, to obtain a microporous film (C6) having resin (B) on the micropore surfaces. Based on the film weight before and after dipping, the microporous film (C6) was confirmed to have 3.4 g/m$^2$ of resin (B4). The puncture strength of the obtained microporous film (C6) was high at 233 gf, the puncture depth was high at 2.64 mm, and the gas permeability was 312 seconds. The electrolyte solution wettability was a satisfactory value of 6.0 mm.

Example 7

After weighing out 36.5 g of an acrylic-based polymer aqueous dispersion (B5, AKL-CG1 by Asahi Kasei Corp., solid content: 24.0 wt %) in a flask for use as resin (B), 19.5 g of distilled water, 14.0 g of isopropyl alcohol (Kanto Kagaku Co., Ltd.) and 4.5 g of N-methyl-2-pyrrolidone (Kanto Kagaku Co., Ltd.) were weighed out, and a 12.5% acrylic-based polymer dispersion dispersing an acrylic-based polymer was obtained.

The microporous film (C0) obtained in Example 1 was dipped in the dispersion for 10 minutes and then removed, the dispersion remaining on the surface was removed with a resin roller on a glass plate, and then drying was carried out for 1 hour on a glass plate at room temperature, to obtain a microporous film (C7) having resin (B) on the micropore surfaces. Based on the film weight before and after dipping, the microporous film (C7) was confirmed to have 3.4 g/m$^2$ of resin (B5). The puncture strength of the obtained microporous film (C7) was high at 224 gf, the puncture depth was high at 2.85 mm, and the gas permeability was 59 seconds. The electrolyte solution wettability was a satisfactory value of 6.0 mm.

Example 8

After weighing out 30.0 g of a polyolefin-based copolymer aqueous dispersion (B6, DB-4010 by Unitika, Ltd., solid content: 25.0 wt %) in a flask for use as resin (B), 30.0 g of distilled water and 15.0 g of isopropyl alcohol (Kanto Kagaku Co., Ltd.) were weighed out, and a 10% polyolefin-based polymer dispersion dispersing a polyolefin-based polymer was obtained.

The microporous film (C0) obtained in Example 1 was dipped in the dispersion for 10 minutes and then removed, the dispersion remaining on the surface was removed with a resin roller on a glass plate, and then drying was carried out for 1 hour on a glass plate at room temperature, to obtain a microporous film (C8) having resin (B) on the micropore surfaces. Based on the film weight before and after dipping, the microporous film (C8) was confirmed to have 1.9 g/m$^2$ of resin (B6). The puncture strength of the obtained microporous film (C8) was high at 221 gf, the puncture depth was high at 2.61 mm, and the gas permeability was 286 seconds. The electrolyte solution wettability was a satisfactory value of 5.0 mm.

Example 9

After weighing out 20.0 g of a polyolefin-based copolymer aqueous dispersion (B7, ZAIKTHENE L by Sumitomo Seika Chemicals Co., Ltd., solid content: 24.5 wt %) in a flask for use as resin (B), 36.0 g of distilled water, 18.0 g of isopropyl alcohol (Kanto Kagaku Co., Ltd.) and 6.0 g of N-methyl-2-pyrrolidone (Kanto Kagaku Co., Ltd.) were weighed out, and a 6% polyolefin-based polymer dispersion dispersing a polyolefin-based polymer was obtained.

The obtained dispersion was coated onto the microporous film (C0) obtained in Example 1 using a bar coater (#18), on a dust-free sheet spread out over a glass plate, after which drying was carried out for 1 hour at room temperature on a dust-free sheet spread out over a glass plate, to obtain a microporous film (C9) having resin (B) on the micropore surfaces. Based on the film weight before and after dipping, the microporous film (C9) was confirmed to have 1.9 g/m$^2$ of resin (B7). The puncture strength of the obtained microporous film (C9) was high at 230 gf, the puncture depth was high at 2.70 mm, and the gas permeability was 200 seconds. The electrolyte solution wettability was a satisfactory value of 5.0 mm. The fuse temperature was 104° C.

Example 10

After weighing out 20.0 g of a water dispersion of a polyolefin-based polymer (B8, ZAIKTHENE N produced by Sumitomo Seika Chemicals Co., Ltd., Solid content: 24.5 wt %) in a flask for use as resin (B), 36.0 g of distilled water, 18.0 g of isopropyl alcohol (Kanto Kagaku Co., Ltd.) and 6.0 g of N-methyl-2-pyrrolidone (Kanto Kagaku Co., Ltd.) were weighed out, and a 6% polyolefin-based polymer dispersion dispersing a polyolefin-based polymer was obtained.

The obtained dispersion was coated onto the microporous film (C0) obtained in Example 1 using a bar coater (#18), on a dust-free sheet spread out over a glass plate, after which drying was carried out for 1 hour at room temperature on a dust-free sheet spread out over a glass plate, to obtain a microporous film (C10) having resin (B) on the micropore surfaces. Based on the film weight before and after dipping, the microporous film (C10) was confirmed to have 1.6 g/m$^2$ of resin (B8). The puncture strength of the obtained microporous film (C10) was high at 228 gf, the puncture depth was high at 2.65 mm, and the gas permeability was 161 seconds. The electrolyte solution wettability was a satisfactory value of 5.0 mm. The fuse temperature was 99° C.

Example 11

After weighing out 2.3 g of an aluminum hydroxide particle (average particle size: 2.0 μm) for use as an inorganic filler and 10.0 g of a water dispersion of a polyolefin-based polymer (B7, ZAIKTHENE L produced by Sumitomo Seika Chemicals Co., Ltd., Solid content: 24.5 wt %) for use as resin (B) in a flask, 11.3 g of distilled water, 9.0 g of isopropyl alcohol (Kanto Kagaku Co., Ltd.) and 3.0 g of N-methyl-2-pyrrolidone (Kanto Kagaku Co., Ltd.) were weighed out, and a 6% polyolefin-based polymer dispersion dispersing a polyolefin-based polymer was obtained.

The obtained dispersion was coated onto the microporous film (C0) obtained in Example 1 using a bar coater (#18), on a dust-free sheet spread out over a glass plate, after which drying was carried out for 1 hour at room temperature on a dust-free sheet spread out over a glass plate, to obtain a microporous film (C11) having an inorganic-filler porous layer as well as resin (B) on the micropore surfaces. Based on the film weight before and after dipping, the microporous film (C11) was confirmed to have 2.1 g/m$^2$ of resin (B7). The puncture strength of the obtained microporous film (C11) was high at 246 gf, the puncture depth was high at 2.60 mm, and the gas permeability was 139 seconds. The electrolyte solution wettability was a satisfactory value of 5.1 mm.

Comparative Example 1

The performance of the microporous film (C0) obtained in Example 1 but without treatment with resin (B) was evaluated. The puncture strength of the microporous film (C0) was 178 gf, the puncture depth was 2.23 mm, and the gas permeability was 39 seconds. The wettability of the electrolyte solution was 3.0 mm. As mentioned above, FIG. 1 shows a SEM photograph of the surface of the microporous film (C0) without addition of resin (B1) in Comparative Example 1, FIG. 2 shows a SEM photograph of its MD cross-section, and FIG. 6 shows a depth-stress curve in the puncture test.

Comparative Example 2

After mixing 95 wt % of a polypropylene resin (MFR: 2.0, density: 0.91) and 5 wt % of a polyolefin elastomer with an elastic modulus of 108 MPa (ENGAGE by Dow Chemical Corp.), the mixture was loaded through a feeder into a single-screw extruder set to a pore diameter of 30 mm, L/D=30 and a temperature of 200° C., and extruded from a T-die (200° C.) with a lip thickness of 2.5 mm set at the extruder tip. Immediately following this, an air knife was used to blow cold air at 25° C. onto the molten resin, and the resin was taken up onto a cast roll set to 95° C., at a draw ratio of 200 and a take-up speed of 20 m/min, and shaped into a film.

The obtained film was subjected to annealing for 1 hour in a hot air circulating oven heated to 145° C. The annealed film was then subjected to uniaxial stretching at a temperature of 25° C. to a factor of 1.2 in the machine direction, to obtain a cold drawn film. The cold drawn film was subsequently subjected to uniaxial stretching at a temperature of 140° C. to a factor of 2.5 in the machine direction, and heat set at 150° C. to obtain a uniaxially stretched film. The uniaxially stretched film was subjected to uniaxial stretching at a temperature of 145° C. to a factor of 4.0 in the transverse direction, and heat set at 145° C., to obtain a microporous film (C10).

The puncture strength of the microporous film (C10) was 184 gf, the puncture depth was 2.34 mm, and the gas permeability was 54 seconds. The wettability of the electrolyte solution was 3.0 mm. With only admixture of a polyolefin elastomer by melt kneading, presumably the elastomer was not sufficiently present on the surfaces of the micropores of the micropore film, and therefore the puncture depth and puncture strength failed to adequately increase, while no increase was seen in the electrolyte solution wettability.

Comparative Example 3

After weighing out 6 g of a polypropylene resin (B8, F113G by Prime Polymer Co., Ltd.) with an elastic modulus of 1600 MPa in a flask for use as resin (B), and 194 g of octane (Wako Pure Chemical Industries, Ltd.), it was attempted to dissolve the polypropylene resin, but it did not dissolve in the octane.

Comparative Example 4

After weighing out 2.3 g of an aluminum hydroxide particle (average particle size: 2.0 μm) for use as an inorganic filler and 10.0 g of a water dispersion of a polyolefin-based polymer (B7, ZAIKTHENE L produced by Sumitomo Seika Chemicals Co., Ltd., Solid content: 24.5 wt %) for use as resin (B) in a flask, 23.3 g of distilled water were weighed out, and a 6% polyolefin-based polymer dispersion dispersing a polyolefin-based polymer was obtained.

The obtained dispersion was coated onto the microporous film (C0) obtained in Example 1 using a bar coater (#18), on a dust-free sheet spread out over a glass plate, after which drying was carried out for 1 hour at room temperature on a dust-free sheet spread out over a glass plate, to obtain a microporous film (C24) having an inorganic-filler porous layer as well as resin (B) on the micropore surfaces. Based on the film weight before and after dipping, the microporous film (C24) was confirmed to have 1.9 g/m² of resin (B7). The puncture strength of the obtained microporous film (C24) was high at 183 gf, the puncture depth was 2.20 mm, and the gas permeability was 120 seconds. The electrolyte solution wettability was 3.1 mm.

In a TEM measurement of MD cross-section of the microporous film (C24), resin (B7) was not confirmed to exist in an intermediate layer of the microporous film (C24).

The details of the resins, base films and porous films used in Examples 1 to 11 and Comparative Examples 1 to 4 are shown in Tables 1 to 3.

TABLE 1

|  | Example 1 | Example 2 | Example 3 | Example 4 | Example 5 | Example 6 |
| --- | --- | --- | --- | --- | --- | --- |
| Porous film base | C0 | C0 | C0 | C0 | C0 | C0 |
| Resin A | Polypropylene resin | Polypropylene resin | Polypropylene resin | Polypropylene resin | Polypropylene resin | Polypropylene resin |
| Resin B | C4/C3 α-olefin copolymer | C4/C3 α-olefin copolymer | C4/C3 α-olefin copolymer | C3/C4 α-olefin copolymer | Low stereoregular polypropylene | Polyurethane acrylate |
| Resin B elastic modulus (@25° C.) | 260 MPa | 260 MPa | 260 MPa | 520 MPa | 110 MPa | — |
| Porous film | C1 | C2 | C3 | C4 | C5 | C6 |
| Thickness (μm) | 13 | 13 | 13 | 13 | 13 | 12 |
| Basis weight (g/m²) | 4.5 | 5.3 | 5.2 | 5.2 | 5.2 | 6.8 |
| Porosity (%) | 62 | 55 | 56 | 56 | 56 | 41 |
| Puncture strength (gf) | 240 | 270 | 264 | 262 | 258 | 233 |
| Puncture depth (mm) | 2.80 | 2.89 | 2.88 | 2.81 | 2.82 | 2.64 |
| Air permeability (sec/100 cc) | 129 | 244 | 220 | 288 | 183 | 312 |
| Wettability (mm) | 5.0 | 5.5 | 5.0 | 5.0 | 6.0 | 6.0 |

TABLE 2

|  | Example 7 | Example 8 | Example 9 | Example 10 | Example 11 |
| --- | --- | --- | --- | --- | --- |
| Porous film base | C0 | C0 | C0 | C0 | C0 |
| Resin A | Polypropylene resin | Polypropylene resin | Polypropylene resin | Polypropylene resin | Polypropylene resin |
| Resin B | Acrylic copolymer | Polyolefin polymer | Polyolefin polymer | Polyolefin polymer | Polyolefin polymer |
| Resin B elastic modulus (@25° C.) | — | — | — | — | — |
| Porous film | C7 | C8 | C9 | C10 | C11 |

TABLE 2-continued

|  | Example 7 | Example 8 | Example 9 | Example 10 | Example 11 |
|---|---|---|---|---|---|
| Thickness (μm) | 12 | 12 | 12 | 12 | — |
| Basis weight (g/m²) | 6.8 | 5.3 | 5.3 | 5.0 | — |
| Porosity (%) | 53 | 56 | 55 | 58 | — |
| Puncture strength (gf) | 224 | 221 | 230 | 228 | 246 |
| Puncture depth (mm) | 2.85 | 2.61 | 2.70 | 2.65 | 2.60 |
| Air permeability (sec/100 cc) | 59 | 286 | 200 | 161 | 139 |
| Wettability (mm) | 6.0 | 5.0 | 5.0 | 5.0 | 5.1 |
| Fuse Temperature (° C.) | — | — | 104 | 99 | — |

TABLE 3

|  | Comparative Example 1 | Comparative Example 2 | Comparative Example 3 | Comparative Example 4 |
|---|---|---|---|---|
| Porous film base | C0 | C10 | C0 | C0 |
| Resin A | Polypropylene resin | Polypropylene resin/polyolefin elastomer | Polypropylene resin | Polypropylene resin |
| Resin B | — | — | Polypropylene resin | Polyolefin polymer |
| Resin B elastic modulus (@25° C.) | — | — | 1600 MPa | — |
| Porous film | C0 | C22 | — | C24 |
| Thickness (μm) | 13 | 13 | — | — |
| Basis weight (g/m²) | 3.4 | 3.6 | — | — |
| Porosity (%) | 71 | 70 | — | — |
| Puncture strength (gf) | 178 | 184 | — | 183 |
| Puncture depth (mm) | 2.23 | 2.34 | — | 2.20 |
| Air permeability (sec/100 cc) | 39 | 54 | — | 120 |
| Wettability (mm) | 3.0 | 3.0 | — | 3.1 |
| Fuse Temperature (° C.) | 178 | 180 | — | — |

EXPLANATION OF SYMBOLS

1 Needle with 0.5 mm-radius hemispherical tip
2 Separator
3 Separator-holding plate
dia. Diameter of plate opening (11 mm)
D Puncture depth at maximum puncture load (puncture strength) (mm)

The disclosure or invention is not limited to the above examples or embodiments. For example, the separator for a lithium-ion secondary battery of one embodiment may comprise a porous or microporous film, the porous or microporous film comprising a polyolefin resin (A) as the major component and a resin (B) covering at least one area of the surfaces of the pores or micropores of the porous or microporous film. In the first embodiment, the resin (B) is different from the polyolefin resin (A) and the resin (B) may fill the pores of the film sufficiently to produce resultant micropores.

What is claimed is:

1. A separator for a lithium-ion secondary battery, comprising a microporous film, wherein the microporous film comprises:
   a polyolefin resin (A) comprising polypropylene as a major component; and
   interior surfaces of micropores in the microporous film are coated with a resin (B) different from the polyolefin resin (A), and a coated amount of the resin (B) is 5 to 70 weight % based on the total resin weight,
   wherein the resin (B) is a C3 unit-containing polyolefin copolymer, or a polyolefin with an elastic modulus of 110 to 520 MPa at 25° C. and a melting point of no higher than 130° C.;
   wherein the separator has a porosity of 41% to 58%, and an air permeability of 161 sec/100 cc to 244 sec/100 cc, and
   wherein the separator is free of a fluorine-containing resin binder.

2. The separator according to claim 1, wherein the micropores are formed with fibrils of the polyolefin resin (A), and outer surfaces of the fibrils are surrounded by the resin (B).

3. The separator according to claim 1, wherein, in an intermediate layer selected among three layers obtained by trisecting the separator in the film thickness direction, at least one part of a surface layer of a skeleton consisting of the polyolefin resin (A) is coated with the resin (B).

4. The separator according to claim 1, wherein the separator has a puncture depth of 2.5 mm or more.

5. The separator according to claim 4, wherein the puncture depth is more than 2.5 mm and equal to or less than 4.5 mm.

6. The separator according to claim 1, wherein the resin (B) has an elastic modulus at 25 degrees Celsius of 110 to 520 MPa.

7. The separator according to claim 6, wherein the elastic modulus at 25 degrees Celsius is 110 to 520 MPa.

8. The separator according to claim 1, wherein the resin (B) is a hydrophobic resin.

9. The separator according to claim 8, wherein the hydrophobic resin has a solubility in octane at 25 degrees Celsius of 20 g/kg or more.

10. The separator according to claim 8, wherein the hydrophobic resin is a polyolefin resin having an elastic modulus at 25 degrees Celsius of 110 to 520 MPa.

11. The separator according to claim 1, wherein the separator has a puncture strength of 0.25 kgf or more.

12. The separator according to claim 1, wherein the membrane thickness of the separator is equal to or less than 100 μm.

13. The separator according to claim 1, wherein a fuse temperature of the separator is less than 150 degrees Celsius.

14. The separator according to claim 1, wherein the microporous film is obtainable by stretching a precursor comprising the polyolefin resin (A), and subsequently impregnating the stretched product with the resin (B).

15. The separator according to claim 14, wherein the microporous film is obtainable by stretching the precursor in at least a transverse direction (TD), and subsequently impregnating the TD-stretched product with the resin (B).

16. The separator according to claim 15, wherein the microporous film is obtainable by stretching the precursor in at least the transverse direction (TD), calendering the TD-stretched product, and subsequently impregnating the calendered product with the resin (B).

17. The separator according to claim 15, wherein the microporous film is obtainable by stretching the precursor in at least the transverse direction (TD), impregnating the TD-stretched product with the resin (B), and subsequently calendering the impregnated product.

18. The separator according to claim 14, wherein the microporous film is obtainable by stretching the precursor in at least a machine direction (MD), and subsequently impregnating the MD-stretched product with the resin (B).

* * * * *